United States Patent
Goodman et al.

(10) Patent No.: US 12,294,587 B2
(45) Date of Patent: May 6, 2025

(54) SYSTEM AND METHOD FOR ENFORCING A SECURITY FRAMEWORK FOR HIGH-RISK OPERATIONS

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/302,266

(22) Filed: Apr. 18, 2023

(65) Prior Publication Data

US 2024/0356927 A1    Oct. 24, 2024

(51) Int. Cl.
*H04L 9/40* (2022.01)

(52) U.S. Cl.
CPC .......... *H04L 63/105* (2013.01); *H04L 63/104* (2013.01)

(58) Field of Classification Search
CPC .............................. H04L 63/105; H04L 63/104
See application file for complete search history.

(56) References Cited

U.S. PATENT DOCUMENTS

| | | | | |
|---|---|---|---|---|
| 8,491,391 | B2 * | 7/2013 | Brunet de Courssou | H04L 9/3263 463/43 |
| 2003/0097409 | A1 * | 5/2003 | Tsai | H04L 63/1408 709/206 |
| 2004/0205379 | A1 * | 10/2004 | Hilland | H04L 63/104 714/5.11 |
| 2006/0026017 | A1 * | 2/2006 | Walker | H04L 63/302 701/31.4 |
| 2007/0089163 | A1 * | 4/2007 | Denton | H04L 63/0823 726/2 |
| 2008/0178300 | A1 * | 7/2008 | Brown | H04W 12/033 726/29 |
| 2009/0260060 | A1 * | 10/2009 | Smith | H04L 63/105 715/753 |
| 2014/0007222 | A1 * | 1/2014 | Qureshi | H04L 67/10 726/16 |
| 2014/0096200 | A1 * | 4/2014 | Brown | G06F 21/62 726/4 |
| 2015/0271162 | A1 * | 9/2015 | Dulkin | H04L 63/1408 726/7 |
| 2016/0241548 | A1 * | 8/2016 | Kim | H04L 63/0838 |

(Continued)

FOREIGN PATENT DOCUMENTS

| | | | | |
|---|---|---|---|---|
| CN | 109416712 A | * | 3/2019 | .......... G05D 1/0038 |
| JP | 2020179752 A | * | 11/2020 | |

(Continued)

*Primary Examiner* — John B King
(74) *Attorney, Agent, or Firm* — WOMBLE BOND DICKINSON (US) LLP

(57) ABSTRACT

Systems, devices, and methods for managing data processing systems are disclosed. The data processing systems may provide computer implemented services based on commands provided to the data processing systems. To manage the data processing systems, a security framework may be enforced to interpret and/or resolve commands as the commands are invoked. The security framework may be deployed to data processing systems to reduce the likelihood of undesired use and/or interaction with the data processing systems.

20 Claims, 7 Drawing Sheets

(56) References Cited

U.S. PATENT DOCUMENTS

| | | | | |
|---|---|---|---|---|
| 2017/0034005 A1* | 2/2017 | Liang | ................... | H04L 45/38 |
| 2017/0208038 A1* | 7/2017 | Hinaman | ............... | H04L 63/083 |
| 2018/0342360 A1* | 11/2018 | Hong | ................... | H01H 71/04 |
| 2019/0081927 A1* | 3/2019 | Pham | ................. | H04L 63/0263 |
| 2019/0102575 A1* | 4/2019 | Barday | ................ | H04L 63/104 |
| 2019/0306172 A1* | 10/2019 | Dande | ................. | H04L 63/102 |
| 2021/0266334 A1* | 8/2021 | Bacastow | ........... | H04L 63/1408 |

FOREIGN PATENT DOCUMENTS

| | | | | |
|---|---|---|---|---|
| JP | 2024085645 A | * | 6/2024 | |
| WO | WO-0142942 A1 | * | 6/2001 | ............ G06Q 10/10 |

* cited by examiner

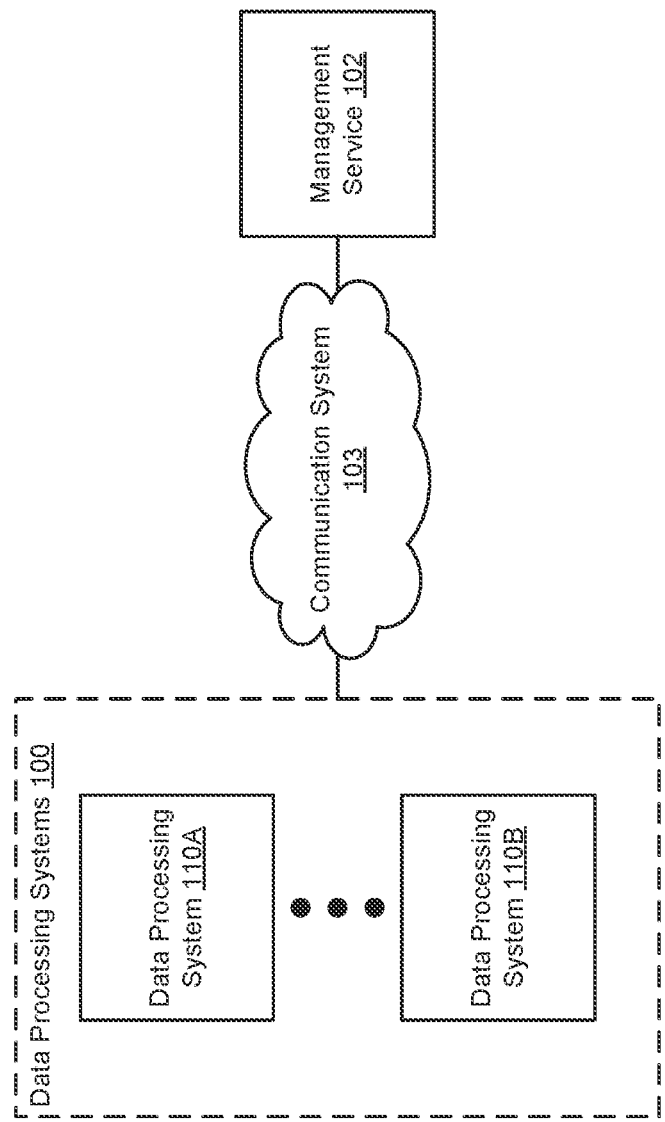

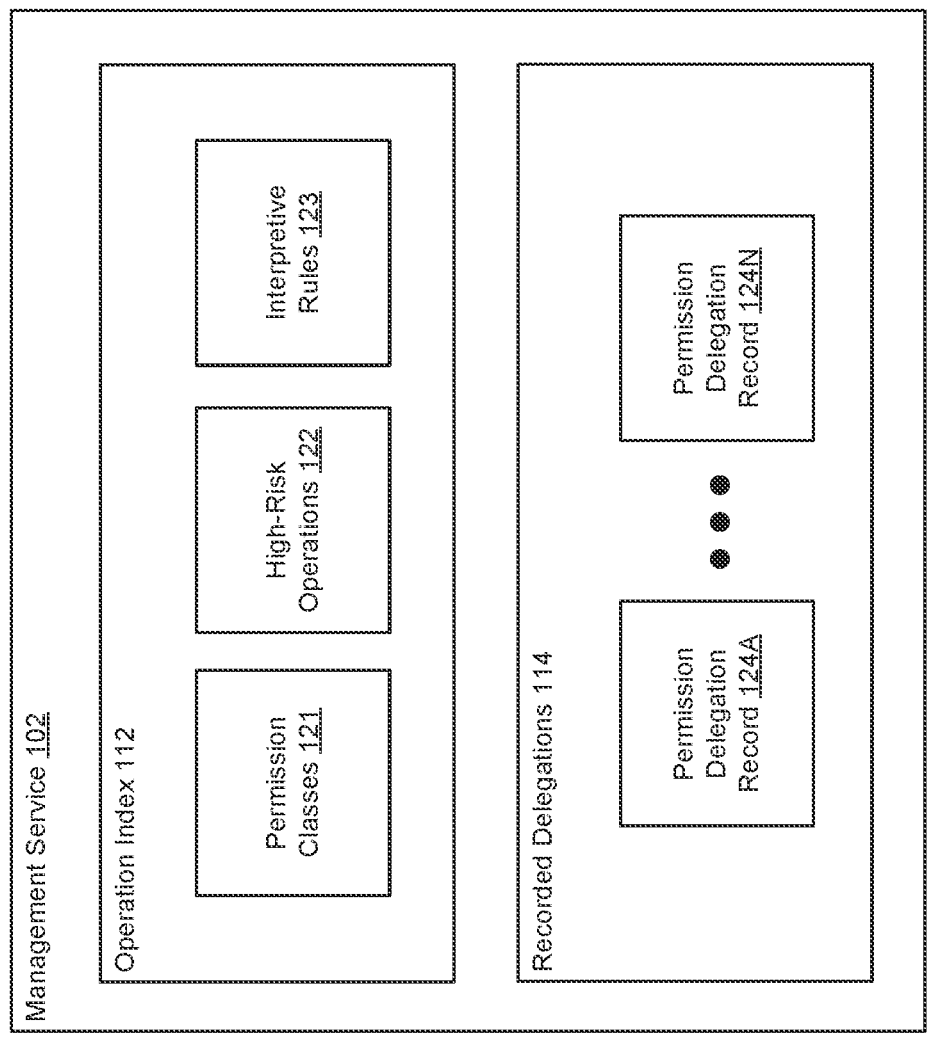

Permission Class 126A

- Operation 1
- Operation 2
- Operation 3
- Operation 4
- Operation 5
- High-Risk Operation
- Operation 7
- Operation 8

FIG. 2C

Permission Class 126A

- Operation 1
- Operation 2
- Operation 3
- Operation 4
- Operation 5
- Operation 7
- Operation 8

FIG. 2D

SYSTEM AND METHOD FOR ENFORCING A SECURITY FRAMEWORK FOR HIGH-RISK OPERATIONS

FIELD

Embodiments disclosed herein relate generally to managing data processing systems. More particularly, embodiments disclosed herein relate to systems and methods to secure systems by enforcing a security framework.

BACKGROUND

Computing devices may provide computer implemented services. The computer implemented services may be used by users of the computing devices and/or devices operably connected to the computing devices. The computer implemented services may be performed based on commands provided by the users. Operations initiated by the commands may impact performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIG. 2A-2D show diagrams illustrating data structures in accordance with an embodiment.

DETAILED DESCRIPTION

Figure 2B:
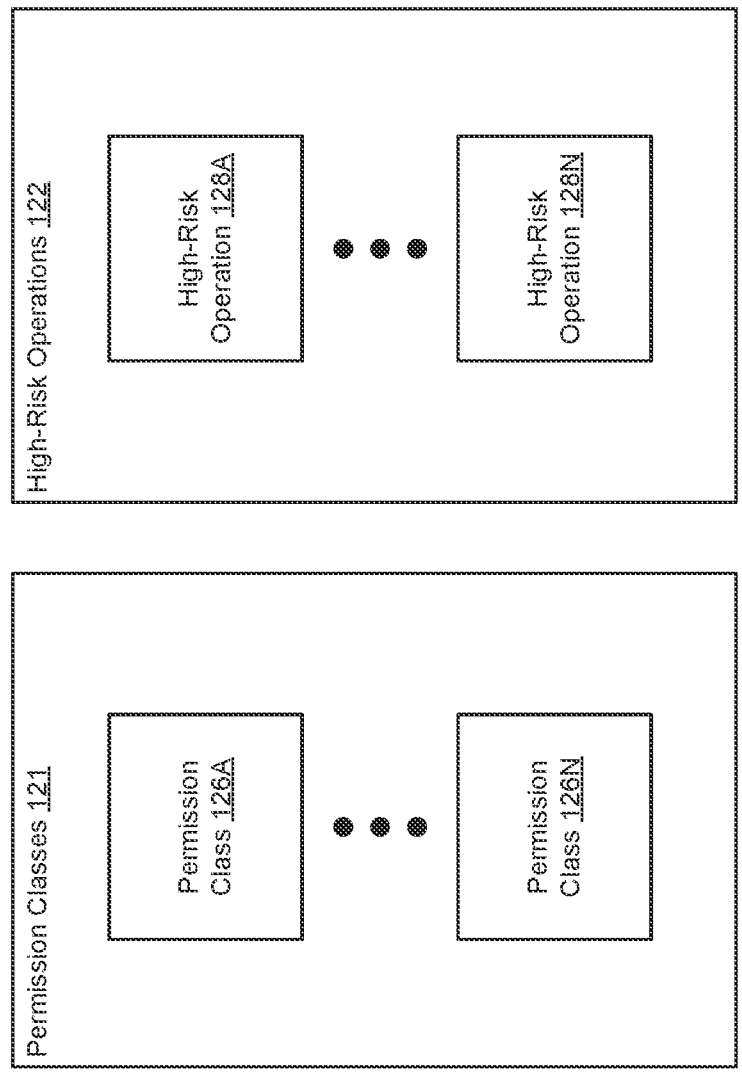

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer implemented services. To provide the computer implemented services, the data processing systems may obtain commands. These commands may indicate operations on which the computer implemented services depend. For example, the commands may indicate any type and/or quantity of operations that are performable by data processing systems. These operations may determine how the computer implemented services are to be provided by said data processing systems.

To obtain the commands, an entity may interact with a data processing system to provide the commands (to the data processing system or to another data processing system using the data processing system). By doing so, the entity may consume computer implemented services that are based on the commands provided by the entity.

However, some of the various types of commands may be disadvantageous to the data processing systems (and/or users thereof) if executed. Such commands may be one-way commands that are each irreversible using a mechanism able to reverse an outcome of each respective command. Consequently, one-way commands may cause undesired effects such as large amounts of downtime while an additional mechanism is sought to reverse the effects of the one-way commands.

In general, embodiments disclosed herein may provide methods, systems, and/or devices for securing systems using a security framework. The security framework may be used to manage permissions delegated to users of the systems. Such delegations may involve the interpretation and resolution of permissions associated with one-way commands.

The security framework may be managed and/or deployed to the systems using a management service. To manage the security framework, the management service may, for example, (i) implement a permissions delegation model for managing permissions and (i) implement a permissions evaluation model for interpreting and/or resolving permissions.

The permission delegation model and/or permission evaluation model may reduce risk associated with permission delegations by requiring a higher level of explicitness in delegation of permissions (e.g., class level delegations and/or explicit delegations) for one-way commands while facilitating ease of delegation of permission for other commands that are not classified as being one-way commands.

Such systems using the security framework may be less likely to be impacted by undesired effects caused by one-way commands. Thus, such methods, systems, and/or devices for securing systems using the security framework may enhance the security of data processing systems.

In an embodiment, a method for performing a security framework is provided. The method may include obtaining a request for a data processing system to perform a command, the request being from a first entity; making a determination regarding whether the command is a one-way command, and the one-way command is any command having an impact that cannot be reversed using a same mechanism through which a performance of the one-way command is initiated; in a first instance of the determination where the command is the one-way command: performing at least one security operation to mitigate an impact of performance of the one-way command; and in a second instance of the determination where the command is not any one-way command: initiating performance of the command without performing any of the at least one security operation.

The method may further include identifying permissions: for initiating performance of commands by the data processing system, and that are delegated to the first entity; and making a second determination, based on the permissions, regarding whether the first entity has permission to initiate performance of the command; and in a first instance of the second determination where the first entity has the permission to initiate performance of the command: initiating the making of the determination.

The permissions are identified by parsing permission delegations for the first entity, and a first of the permission delegations for the first entity indicates delegation of a first class of the permissions and a second of the permission delegations for the first entity indicates delegation of a permission member of a second class of the permissions, and the permission member being a command executable by the data processing system.

Making the second determination, based on the permissions, regarding whether the first entity has permission to initiate the performance of the command may include: discriminating a first portion of permissions from the first class of the permissions that indicate performance of non-one-way operations; discriminating a second portion of permissions from the first class of the permissions that indicate performance of one-way operations; establishing a set of valid permissions based on the first portion of the permissions from the first class of the permissions and the permission member of the second class of the permissions; and making the second determination using the set of valid permissions.

The permission member indicates performance of one of the one-way operations.

The first class of the permissions and the second class of the permissions are a same class.

The at least one security operation may further includes: identifying a proximity of the first entity to the data processing system; making a third determination regarding whether the proximity meets a proximity criteria; in a first instance of the third determination where the proximity meets the proximity criteria: initiating performance of the command by the data processing system to service the request; and in a second instance of the third determination where the proximity does not meet the proximity criteria; denying performance of the command to service the request.

Obtaining the proof of proximity may include disallowing use of all mechanisms through which information may be provided to the data processing system via proxying; obtaining, while the use of the mechanisms is disallowed, issuing a request for confirmation of performance of the one-way command; and determining the proof of proximity based on any response to the request that is obtained by the data processing system.

Obtaining the proof of proximity may include issuing a request for confirmation of performance of the one-way command; identifying a latency of communications between the data processing system and a device that provided a response to the request for the confirmation; and determining the proof of proximity based on the latency of the communication.

Obtaining the proof of proximity may include issuing a request for confirmation of performance of the one-way command using a display that is known to be local to the data processing system, and a code being shown using the display; obtaining a response to the request; and determining the proof of proximity based whether the response is based on the code.

Obtaining the proof of proximity may include issuing a request for confirmation of performance of the one-way command; and determining the proof of proximity based whether an input device that is known to be local to the data processing system is used to provide a response to the request.

In an embodiment, a non-transitory computer readable medium is provided. The non-transitory computer readable medium may include instructions which when executed by a processor cause the computer-implemented method to be provided.

In an embodiment, a data processing system is provided. The data processing system may include the processor and computer readable medium and may perform the computer-implemented method.

Turning to FIG. 1, a block diagram illustrating a system in accordance with an embodiment is shown. The system shown in FIG. 1 may provide computer implemented services. The computer implemented services may include any type and/or quantity of computer implemented services. For example, the computer implemented services may include data storage services, instant messaging services, database services, and/or any other type of service that may be implemented with a computing device.

To provide the computer implemented services, various types of commands may be obtained. The various types of commands may indicate any type and/or quantity of operations that are performable by data processing systems. These operations may determine how the computer implemented services are to be provided by the data processing systems.

To obtain the various types of commands, an entity (e.g., human or non-human such as a computer program hosted by a data processing system) may interact with a data processing system to provide the commands (to the data processing system or to another data processing system using the data processing system). For example, the entity may directly (or indirectly) interact with the data processing system using peripheral devices (e.g., mouse, keyboard, stylus, etc.) that are operably connected to the data processing system to provide the various types of commands. In another example, an executing program hosted by the data processing system may provide the commands. In a further example, a program hosted by another data processing system may generate and send the command to the data processing system via a message. By doing so, the computer implemented services provided by a data processing system may be influenced by the various types of commands provided by the entity.

However, performance of any command may present risk to continued operation of the data processing systems. If a malicious party issues a malicious command, performance of the malicious command may negatively impact the operation of the data processing system that executed the command.

To reduce risk in commands, the data processing systems may implement permissions-based access control systems. The permissions-based access control systems may limit which commands may be invoked to predetermined entities. For example, an entity may be required to provide credentials or other information through which the data processing systems may identify if the entity has sufficient permissions to invoke the commands. Thus, commands invoked by malicious entities may be prevented, to some extent, by screening based on permissions.

However, malicious entities may attempt to circumvent permissions-based access control systems may using credentials of other entities to invoke commands. Further, if an entity has permissions to invoke commands but elects to invoke some commands that may negatively impact the operation of the data processing systems, then the permissions-based access control systems may not protect the data processing systems.

Even more problematic are one-way commands. One-way commands may be irreversible using (i) a same mechanism in which performance of each respective command is initiated Consequently, if a one-way command is invoked by a malicious entity, or for other reasons, then the impact on the operation of the data processing systems may be more pronounced.

For example, remotely disabling communication capabilities of a data processing system (e.g., an example of a one-way command) may not be reversible remotely because communications with the data processing system are unavailable after the command is executed (e.g., a person may need to directly interact with the data processing system to reenable communication capabilities). Thus, if a malicious entity invokes such a command, the response necessary to reverse the impact of the performance of the command may be outsized compared to the effort required to implement the command.

Consequently, one-way commands may cause undesired effects such as large amounts of downtime while an additional mechanism is sought to reverse the effects of the one-way commands because these additional mechanisms (e.g., such as a traveling to a location where a data processing system is physically present) may be much more time or resource intensive than the mechanisms through which the one-way commands may be invoked.

In general, embodiments disclosed herein may provide methods, systems, and/or devices for securing systems using a security framework. The security framework may reduce the impact of execution of one-way commands on operation of the system. The security framework may (i) enforce additional screening for requests for performance of one-way commands that pass permissions-based screening and (ii) implement a permissions delegation model for managing permissions with respect to one-way commands. The additional screening may be applied to commands secured using classes of permissions. The permission delegation model may reduce risk associated with permission delegations by requiring a higher level of explicitness in delegation of permissions for one-way commands while facilitating ease of delegation of permission for other commands that are not classified as being one-way commands.

Accordingly, systems in accordance with embodiments disclosed here may be less likely to be impacted by undesired effects caused by one-way commands. Thus, such methods, systems, and/or devices for securing systems using the security framework may enhance the security of data processing systems.

To provide the above noted functionality, the system of FIG. 1 may include data processing systems 100, management service 102, and communication system 103. Each of these components is discussed below.

Data processing systems 100 may include any number of data processing systems (e.g., 110A-110B) that may provide computer implemented services. To provide the computer implemented services, any one of these data processing systems (e.g., 110A) may obtain any number and types of commands. A command may indicate an operation to be performed by the data processing system, and/or one or more other data processing systems of data processing systems 100 (e.g., 110B). The command, when performed, may contribute to and/or modify the manner in which the computer implemented services are provided by data processing systems 100.

However, as previously mentioned, some commands (e.g., a one-way command) may be disadvantageous due to being irreversible using a mechanism in which an outcome of the commands is reversable, and therefore, may cause undesired effects. Thus, performance of commands may present risk to the continued operation of data processing systems 100 even when the commands are deemed implementable by permission-based security frameworks.

To reduce the risk associated with performance of commands, data processing systems 100 may enforce a security framework (e.g., provided by management service 102) based on one-way commands (e.g., also referred to as "dangerous operations"). By enforcing the security framework, the data processing systems may be less likely to perform operations (e.g., high-risk operations) that may negatively impact the provided computer implemented services.

Management service 102 may manage the security framework (e.g., establish the security framework), and/or deploy the security framework.

To manage the security framework, management service 102 may use (i) a permission delegation model, and/or (ii) a permission evaluation model. Each of these models is discussed below.

The permission delegation model may be implemented using a framework in which permissions are managed based on classifications for the permissions and rules for interpreting delegations of the permissions.

The permissions may be classified into classes based on, for example, (i) roles for different users so that all permissions for a particular role may be members of a single class of the classes, (ii) activities that users may perform so that all permissions for a type of activity (e.g., data storage activity) may be members of a single class of the classes, (iii) risk level for permissions so that only permissions of similar risk levels are members of a single class of the classes, and/or other criteria to establish differentiable classes of permissions.

The rules for interpreting delegation of the permissions may facilitate class level delegation of permissions while mitigating risks associated with class level delegations. The rules may specify (i) class level delegations of permissions are only actual delegations for permissions within the class that are not for high-risk operations (e.g., the actually granted permission do not extend to permissions for operations within that class that are for high-risk operations), and (ii) explicit delegations of permissions for any type of individual operation (e.g., regardless of whether for a high-risk operation) is an actual delegation. For example, a class of permissions may include some permissions for innocuous operations and other permissions for high-risk operations (e.g., operations that indicate performance of a one-way command). Thus, a delegation for that class of permissions may, without the rules for interpreting delegation of the permissions, result in allowing high-risk operations to be performed thereby presenting risk to continued operation of the data processing systems. To mitigate this risk, the rules for interpreting delegation may provide for resolving permission delegations.

For example, consider a scenario where permission for a first class of permissions is granted. The class of permissions may include a first permission for a first operation that is not a high-risk operation, and a second permission for a second operation that is a high-risk operation. Under the interpretive rules set forth above, the only granted permission for this delegation statement may be for the first operation. Thus, if the grantee attempts to invoke performance of the second operation, the grantee may be treated as lacking permission for the second operation even though the granted class includes a class level grant that includes the second permission for the high-risk operation.

In contrast, if a permission for the high-risk operation is explicitly granted (e.g., as opposed to for a class of permissions that includes permission for the high-risk operation), then under the interpretive rules set forth above, permission for this high-risk operation is considered to have been granted. Although, performance of the high-risk operation may still be barred for other reasons, discussed in greater detail below.

Any number of the classes of permissions may be delegated to any number of authorized entities (e.g., the individual hired as head of IT) within the system of FIG. 1. Accordingly, the permission delegation model may further include, for example, delegating one or more of the classes of permissions, as noted above with respect to the interpretive rules. These class level delegations (and/or explicit delegations) may be recorded for permission evaluation purposes (discussed further with regard to the permission evaluation model).

By classifying permissions in this way, delegation of permissions may prove easier when compared to delegation of individual permissions which may involve a more tedious and/or time-consuming delegation process. For example, delegations for thousands or millions of entities may be required. Consequently, selection and implementation of explicit delegations for all possible permissions (e.g., for commands that an entity may invoke) may be intractable.

The permission evaluation model may be implemented using a framework in which permissions are evaluated. To do so, the permission evaluation model may include, for example, (i) initiating permissions-based screening for requested commands (e.g., using the interpretive rules discussed above), and/or (ii) enforcing additional command screening operations (discussed further below) for any number of commands that pass the permissions-based screening.

The permissions-based screening may be performed, for example, when a request to execute a command is obtained. A permission associated with the command may be evaluated to determine whether a source of the request is permitted (e.g., has the permission) to make the request.

To do so, the recorded delegations (previously mentioned with regard to the permission delegation model) may be used when evaluating the request. The recorded delegations may indicate various permission delegation records associated with authorized entities. Any one of these permission delegation records may indicate any number of permissions that have been delegated (e.g., as class level delegations and/or explicit delegations) to at least one authorized entity (e.g., the source of the request).

By using the recorded delegations when evaluating the request, a permission delegation record of the source of the request may be identified. Using the identified permission delegation record, permissions of the permission delegation records may be parsed to identify any number of individual permissions (e.g., permission members) delegated to the source of the request. Based on the identified permission delegation record, the determination may be made regarding whether the source of the request has actual permission to make the request under the interpretive rules.

It will be appreciated that in some cases, for example, a permission delegation record may be identified for an authorized entity when the authorized entity accesses a system in which the security framework is implemented (rather than when a request is provided by the authorized entity). Thereby allowing for convenient permissions-based screening of requests from the authorized entity (while the entity has access) using the identified permission delegation record.

If the source does not have permission to make the request, performance of the command may be denied, thus servicing the request. Alternatively, if the source does have permission to make the request, then the request may be subjected to additional screening for one-way commands (e.g., if the request is for performance of a one-way command). If the request is for a one-way command, then additional action may be taken to evaluate whether to allow the one-way command to be performed.

The additional action may include identifying whether an entity that invokes that command (e.g., the source that requests for the command to be performed) has access to a mechanism to reverse an outcome of the command. If the entity that invokes the command has access to the mechanism to reverse the outcome of the command, then performance of the command may be authorized. If the entity that invokes the command lacks access to the mechanism to reverse the outcome of the command, then performance of the command may be subjected to additional scrutiny and/or prevented entirely.

For example, consider a scenario in which a data processing system is processing a workload that is necessary for providing computer implemented services. Assume, for this example, that an entity invokes a command (e.g., a one-way command) to remotely power off the data processing system. Doing so may interrupt the workload and delay the computer implemented services from being provided. Additionally, the data processing system may not have a functionality to be powered on remotely, and may require local intervention (e.g., pushing a power button on a chassis) to be powered on. Therefore, if the entity is not capable of initiating the local intervention (e.g., being nearby), then the entity may be unable to reverse the outcome of the command. Thus, preventing performance of such commands (e.g., one-way commands) may be beneficial by decreasing the likelihood of undesired effects, such as delayed computer implemented services, caused by the commands.

To evaluate whether the entity that has access to a mechanism to reverse the outcome of the command, various types of information regarding the entity (and/or data processing systems operated by the entity) may be collected and compared to criteria. For example, the collected information may include whether the entity attempting to invoke a command is proximate to a system that will perform the command (e.g., presuming that the command may be reversed using an alternative mechanism that required some degree of proximity). If the entity is within a threshold proximity (e.g., specified by criteria), then performance of the command may be authorized. Otherwise, performance of the command may be denied.

The information regarding proximity of the entity may be collected using various processes. The various processes may include, for example, (i) determining a latency of communication between a device used to invoke the command and the data processing system to be affected by the command, (ii) requiring the entity to interact with a specific (e.g., local) terminal to provide confirmation for the invoked command, and/or (iii) other processes in which information regarding the entity is obtained (directly and/or indirectly).

Figure 3A:
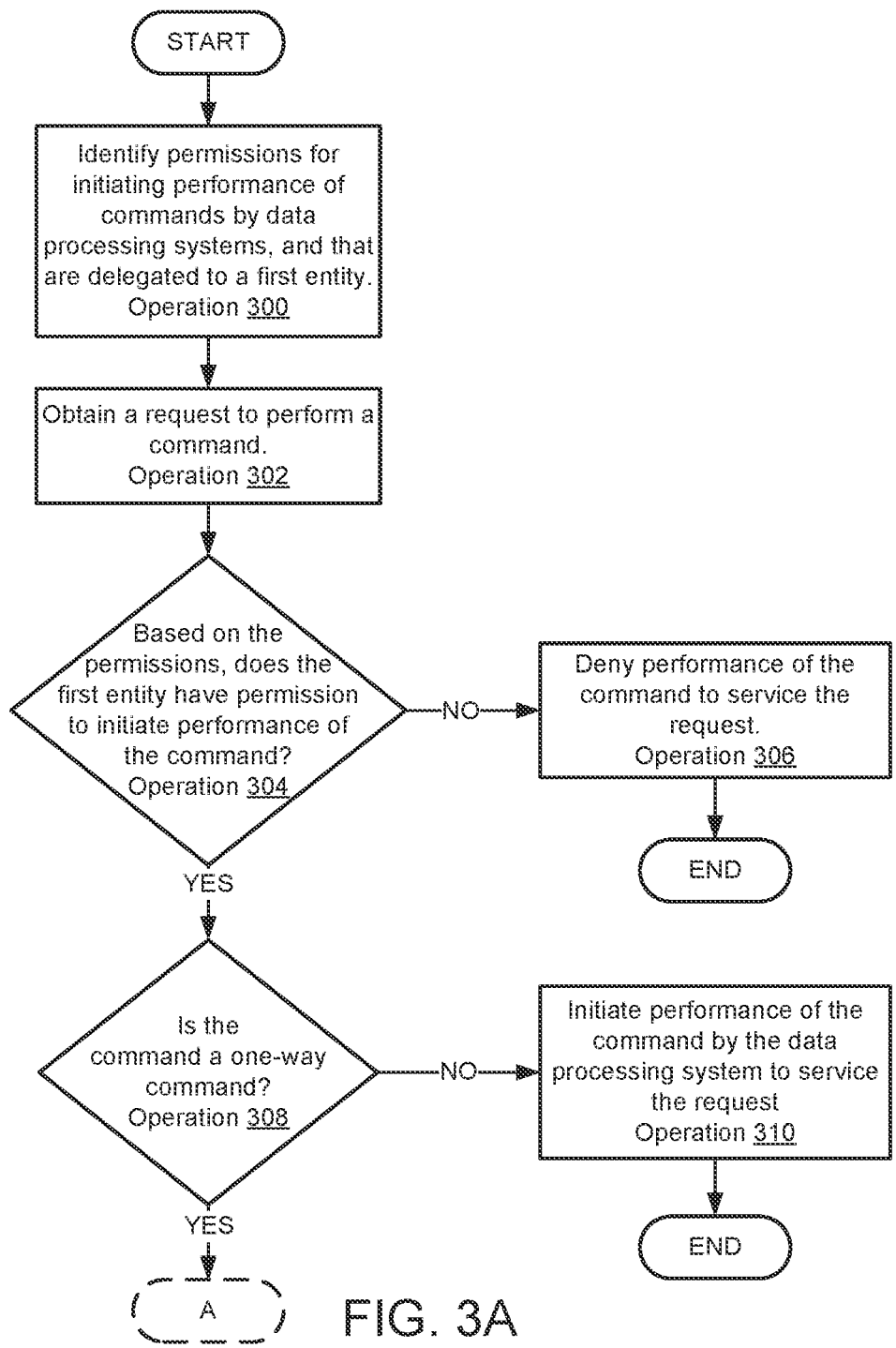
FIGS. 3A-3B show a flow diagram illustrating a method for securing systems using a security framework in accordance with an embodiment.
Figure 3B:
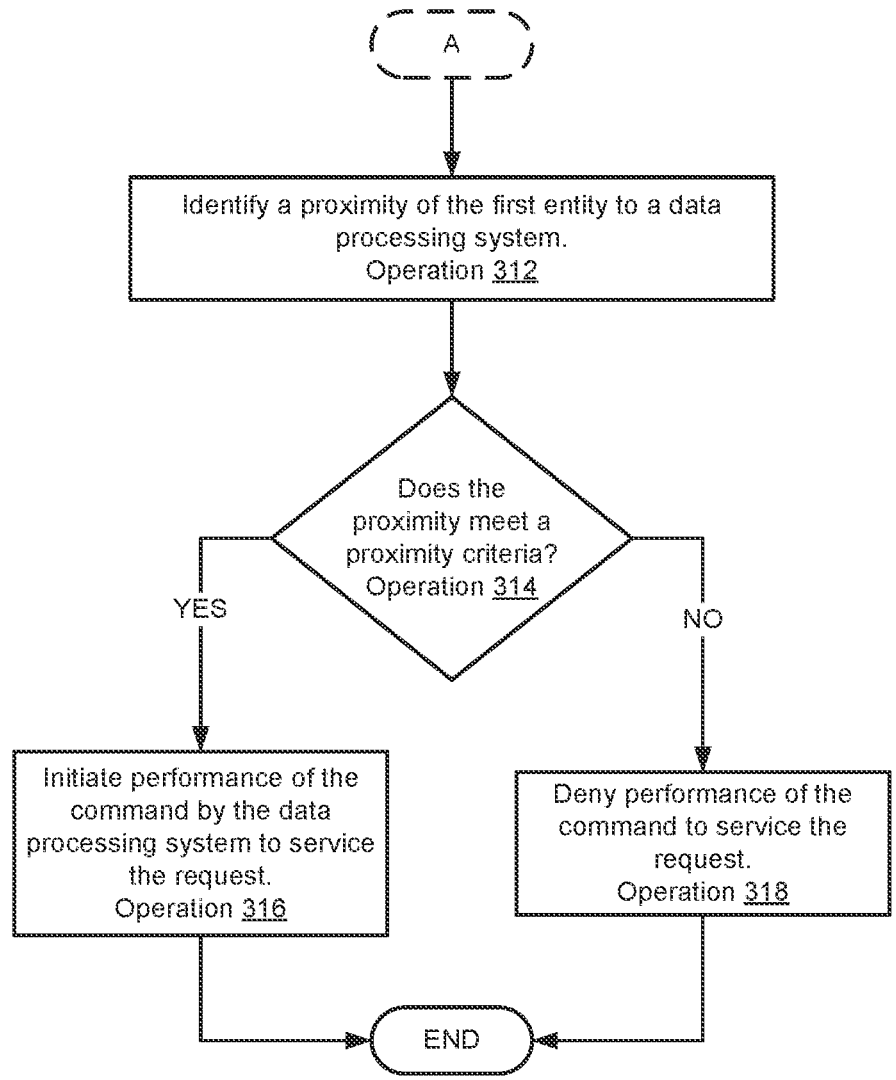

When performing their functionality, management service 102 and/or data processing systems 100 may perform all, or a portion, of the methods and/or actions described in FIGS. 3A-3B.

Data processing systems 100 and/or management service 102 may be implemented using one or more computing devices such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 103. In an embodiment, communication system 103 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data structure diagrams in accordance with an embodiment are shown in FIGS. 2A-2D. The data structure diagrams may illustrate data structures of management service 102 and/or data processing systems 100 that may be used within the system of FIG. 1.

Turning to FIG. 2A, a diagram of management service 102 in accordance with an embodiment is shown. As noted above, management service 102 may manage (e.g., establish) a security framework. To manage the security framework, management service 102 may implement a permission delegation model and/or a permission evaluation model (discussed with respect to FIG. 1). To implement these models, management service 102 may include operation index 112 and recorded delegations 114. Each of these data structures is discussed further below.

Operation index 112 may be implemented using one or more data structures in which classifications for permissions and the interpretive rules ("the rules for interpreting delegations") for the permissions (discussed with respect to FIG. 1) may be recorded. For example, operation index 112 may include permission classes 121, a data structure in which one or more classes of the permissions are defined. To define the classes, permission classes 121 may include, for example, various permission classes (e.g., 126A-126N in FIG. 2B) in which various permission members are listed.

Additionally, operation index 112 may include high-risk operations 122, a data structure in which one or more high-risk operations are defined. For additional information regarding permission classes 121 and/or high-risk operations 122, refer to FIGS. 2B-2D.

Operation index 112 may further include interpretive rules 123, which may include, for example, (i) rules for interpreting the delegations of the permissions ("the interpretive rules"), (ii) operations that when performed implement the interpretive rules, and/or (iii) any other information used to identify and/or resolve permissions.

Recorded delegations 114 may be implemented using one or more data structures that include any number of permission delegation records (e.g., 124A-124N). Each delegation record may include information regarding a history of permissions delegated to an entity.

As previously discussed in FIG. 1, any number of the classes of permissions (e.g., from permission classes 121) may be delegated to any number of authorized entities (e.g., the entity) within the system of FIG. 1. These delegations may be recorded (e.g., in recorded delegations 114) for permission evaluation purposes.

For example, if the entity invokes a command, then a permission delegation record from recorded delegations 114 associated with the entity may be used to determine if a permission (defined using operation index 112) to invoke the command has been granted to the entity.

By using recorded delegations 114 and/or operation index 112, management service 102 may identify and/or resolve (i) class level delegation of permissions, and/or (ii) explicit delegations of permissions.

Turning to FIG. 2B, a diagram of permission classes 121 and high-risk operations 122 in accordance with an embodiment is shown.

As seen in FIG. 2B, and as noted above, permission classes 121 may be a data structure in which the classes of permissions are defined. To do so, permission classes 121 may include any number of permission classes, for example, permission class 126A-126N. Each of these permission classes may include a set of permissions, and any number of permission members from the set may indicate permission to perform a high-risk operation. For additional information regarding the classes of the permission, refer to FIGS. 2C-2D.

Additionally, as seen in FIG. 2B and also noted above, high-risk operations 122 may be a data structure in which any number of high-risk operations, and/or one or more explicit permissions, are defined. For example, high-risk operations 122 may include high-risk operations 128A-128N and may be used to interpret and resolve explicit delegations granted to the entity and/or permissions for high-risk operations included in class level delegations granted to the entity.

Thus, permission classes 126A-126N and/or high-risk operations 128A-128N may be used to interpret delegations of permissions and/or resolve (i) class level delegation of permissions, and/or (ii) explicit delegations of permissions.

While illustrated in FIGS. 2A-2B as having specific structures and organization, it will be appreciated that the structures and organization of data structures included in management service 102 are merely illustrative and the structures and organization may be different without departing from embodiments disclosed herein.

Turning to FIGS. 2C-2D, diagrams illustrating example structures of a class of the permissions (e.g., 126A) in accordance with an embodiment is shown. As noted above, each class of permissions may include a set of permissions in which any number of permission members from the set may indicate permission to perform a high-risk operation.

As seen in FIG. 2C, permission class 126A may include permissions for eight operations. One of the eight operations may be a permission for a high-risk operation.

As previously discussed with regard to FIG. 1, an entity may be delegated a class level delegation in which included permissions of a given class (e.g., 126A of FIG. 2C) are granted to the entity.

However, due to the enforcement of the interpretive rules, permission for the high-risk operation may not be an actual delegation granted to the entity. If the entity were to invoke the high-risk operation, the entity would be treated as not having permission unless an explicit delegation of the permission is granted to the entity. Thus, the class level delegation may be resolved to obtain actual delegations for all but one (e.g., for the high-risk operation) of the permission members included in permission class 126A. Other class level delegations may be resolved with similar enforcement of the interpretive rules with any number of high-risk operations included in any of the other class level delegations.

While depicted in FIG. 2C as including a high-risk operation, it will be appreciated that a permission class (e.g., 126A) may not include any permissions for high-risk operations to be performed.

For example, as seen in FIG. 2D, permission class 126A may not include the permission for the high-risk operation. Accordingly, actual delegations may be obtained for all of the permissions included in permission class 126A.

While illustrated in FIGS. 2C-2D as having a specific structure and specific contents, it will be appreciated that the structure and contents of permission class 126A is merely illustrative and the structure and contents may be different without departing from embodiments disclosed herein.

As discussed above, the components of FIG. 1 may perform various methods to secure systems using a security framework. FIGS. 3A-3B illustrate methods that may be performed by the components of FIG. 1. In the diagrams discussed below and shown in these figures, any of the operations may be repeated, performed in different orders, omitted, and/or performed in parallel with or a partially overlapping in time manner with other operations.

Turning to FIG. 3A, a first portion of two portions of a flow diagram illustrating methods for securing systems using a security framework in accordance with an embodiment is shown. The methods illustrated in FIGS. 3A-3B may be performed by data processing systems 100, management service 102, communication system 103, and/or other components of the system of FIG. 1.

At operation 300, permissions for initiating performance of commands by data processing systems, and that are delegated to a first entity, are identified. The permissions may be identified by obtaining a permission delegation record associated with the first entity, the permission delegation record indicating any class level and/or explicit delegations granted to the first entity.

As discussed with regard to FIGS. 1-2A, the permission delegation record may be obtained from a database of recorded delegations. The recorded delegations may include any number of permission delegation records that are associated with any number of entities.

To obtain the permission delegation record, one or more identifiers of the first entity may be obtained and used in a lookup of the recorded delegations, the lookup returning the permission delegation record based on the one or more identifiers.

The one or more identifiers may include any information usable to differentiate the first entity from other entities. For example, credentials (e.g., a username and password) of the first entity may be used to differentiate the first entity from other entities that have different credentials.

It will be appreciated that performance of the lookup may be initiated, for example, when the first entity accesses (using the credentials and/or other identifiers) one of the data processing systems in which the security framework is enforced. Alternatively, in some cases, the permission delegation record may be obtained when the first entity invokes a command to be performed by the data processing system.

At operation 302, a request to perform a command is obtained. The request may be obtained, for example, by the first entity interacting with the data processing system to provide the request. For example, the first entity may provide the request by interacting with input fields of a graphical user interface (GUI) of the data processing system, by sending the request to the data processing system via another data processing system, etc. This interaction with the input fields may be a direct or indirect interaction. For example, the first entity may provide the request to the data processing system from the data processing system. Alternatively, the first entity may provide the request to the data processing system from another data processing system. The entity may be, for example, a person, a program, or another type of entity that may attempt to invoke performance of a command by the data processing system.

At operation 304, a first determination is made regarding whether the first entity has permission to initiate performance of the command based on the permissions (e.g., identified in operation 300). The first determination may be made by identifying the permission required to initiate performance of the command. Once identified, a comparison may be made between the permission and permissions included in the permission delegation record of the first entity when interpreted under the rules of interpretation for the permission delegation record. If the permission matches one of the permissions actually granted from the permission delegation record, then it may be determined that the permission has been granted to the first entity. Alternatively, if the permission does not match any of the actually granted permissions based on the permission delegation record, then it may be determined that the permission has not been granted to the first entity.

If the first entity is determined to not have the permission to initiate performance of the command, then the method may proceed to operation 306. Otherwise, the method may proceed to operation 308.

At operation 306, to service the request, performance of the command is denied. Performance of the command may be denied by not initiating performance an operation indicated by the command.

The method may end following operation 306.

Returning to operation 304, the method may proceed to operation 308.

At operation 308, a second determination is made regarding whether the command is a one-way command. The second determination may be made by subjecting the command to additional screening. The additional screening may include, for example, identifying whether an outcome of the command is irreversible using a mechanism in which the outcome of the command is reversable (e.g., with a same degree of ease through which invocation of performance of the command was invoked, or with a predetermined degree of ease, and/or by the entity attempting to invoke the one-way command).

For example, remotely disabling communication capabilities of a data processing system may not be reversible remotely (e.g., a person may need to directly interact with the data processing system to reenable communication capabilities). Therefore, if a command indicates an operation to remotely disable communication capabilities, then that command may be a one-way command.

If the command is determined to not be a one-way command, then the method may proceed to operation 310. Otherwise, the method may proceed to block A.

At operation 310, performance of the command is initiated by the data processing system to service the request. Performance of the command may be initiated by performing an operation indicated by the command.

The method may end following operation 310.

Returning to operation 308, the method may proceed to block A following operation 310 if the command is a one-way command (e.g., subject to further screening). Block A may be drawn with a dashed line to illustrate the continuation of the method of FIG. 3A in FIG. 3B.

Turning to FIG. 3B, a second portion of the two portions (connected by block A) of the flow diagram illustrating the methods for securing systems using the security framework in accordance with an embodiment is shown. As previously mentioned, the methods illustrated in FIGS. 3A-3B may be performed by data processing systems 100, management service 102, communication system 103, and/or other components of the system of FIG. 1.

Following block A, the method may proceed to operation 312.

At operation 312, a proximity of the first entity to the data processing system is identified. The proximity may be identified by obtaining various types of information regarding the entity and comparing the information to criteria.

To obtain the various types of information regarding the entity, various processes may be initiated. The various processes may include, for example, (i) determining a latency of communication between a device used to invoke the command and the data processing system to be affected by the command, (ii) requiring the first entity to interact with a specific (e.g., local) terminal to provide confirmation for the invoked command, and/or (iii) other processes in which information regarding the entity is obtained (directly and/or indirectly).

Thus, the proximity may be identified by, for example, determining the latency between a data processing system used by the first entity to invoke the command and the data processing system to be affected by the outcome of the invoked command. To do so, the latency may indicate a time delay in transmission of data, and thus, may further indicate a distance in which the data is transmitted over. This distance may be used as the identified proximity.

At operation 314, a third determination is made regarding whether the proximity meets a proximity criteria. The third determination may be made based on the distance (proximity) indicated by the latency, and requirements defined by the proximity criteria. The requirements may include, for example, a distance from which a mechanism (that is able to reverse an outcome of the command) is available for utilization by the first entity (directly and/or indirectly).

For example, and as previously discussed, remotely disabling communication capabilities of the data processing system may not be reversible remotely (e.g., a person may need to directly interact with the data processing system to reenable communication capabilities). Therefore, the requirements defined by the proximity criteria may include a distance threshold in which the distance between the first entity and the data processing system (to be affected by the outcome of the command) must be within 30 ft. Being within the distance threshold may increase the likelihood of the first entity being able to reverse the outcome of the command by physically traveling to the data processing system. Thus, the likelihood of the data processing system (and systems dependent on the data processing system) experiencing undesired effects caused by one-way commands may be decreased.

If the proximity meets the proximity criteria, then the method may proceed to operation 316. Otherwise, the method may proceed to operation 318.

At operation 316, performance of the command is initiated by the data processing system to service the request. Performance of the command may be initiated by performing an operation indicated by the command.

The method may end following operation 316.

Returning to operation 314, the method may proceed to operation 318.

At operation 318, to service the request, performance of the command is denied. Performance of the command may be denied by not initiating performance an operation indicated by the command.

The method may end following operation 318.

While described in FIG. 3B with testing for proximity to identify whether a one-way command should be performed, it will be appreciated that the test for ascertaining whether a one-way command should be performed may be based on other tests (e.g., to identify whether the one-way command may be reversed with sufficient ease). For example, if the one-way command disables a communication channel of a data processing system, then the test may be to ascertain whether the invoker of the command has access to a different communication channel through which the communication channel may be reactivated.

Thus, using the method illustrated in FIGS. 3A-3B, embodiments disclosed herein may secure systems using the security framework by enforcing the security framework on requested (e.g., invoked) commands. The enforcement of the security framework may decrease the likelihood of such systems experiencing undesired effects caused by one-way commands. By doing so, security of systems (e.g., data processing systems) may be improved.

Figure 4:
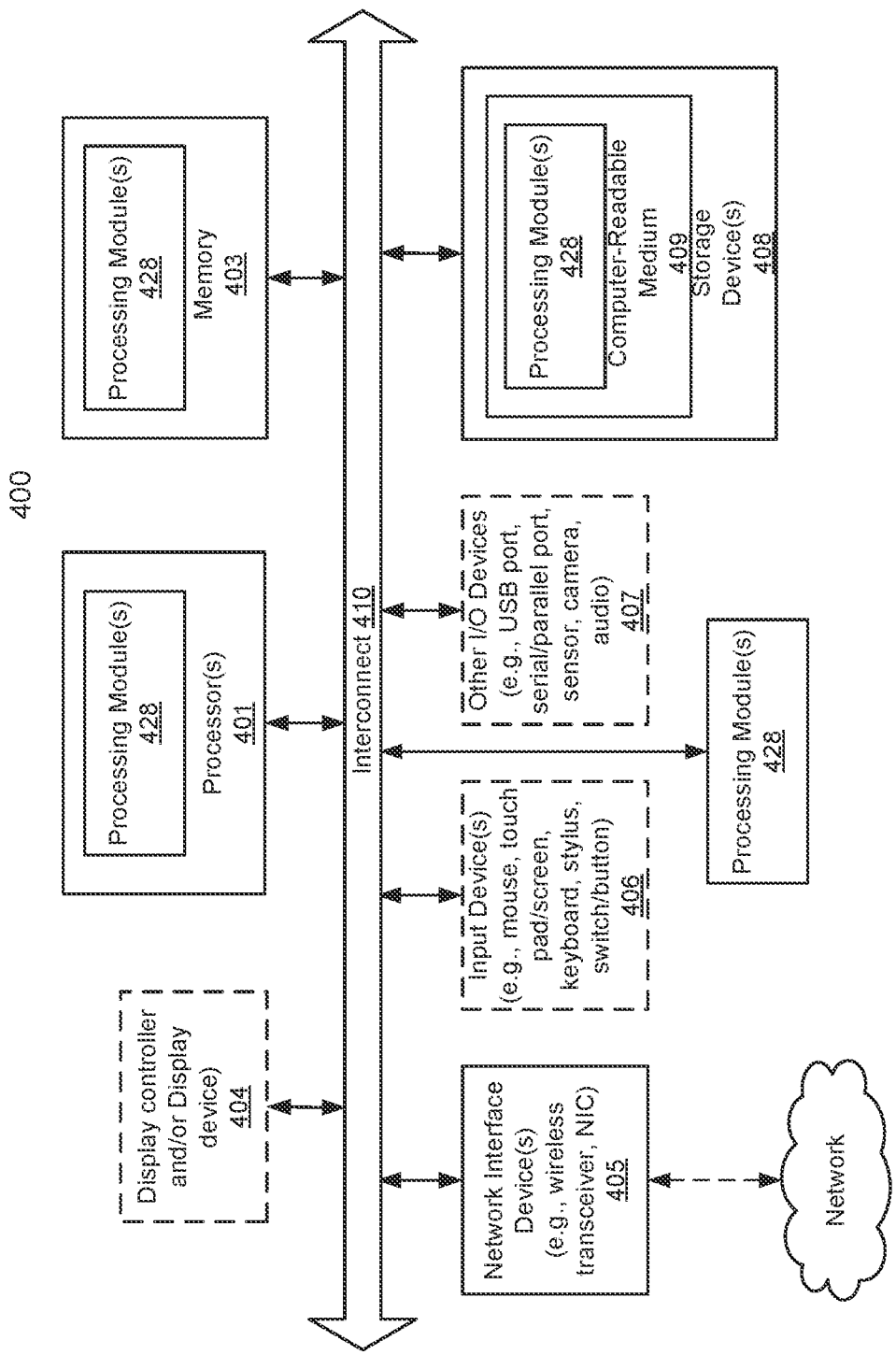
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for performing a security framework, comprising:
   obtaining a request for a data processing system to perform a command, the request being from a first entity;
   making a determination regarding whether the command is a one-way command, and the one-way command is any command having an impact that cannot be reversed using a same mechanism through which a performance of the one-way command is initiated;
   in a first instance of the determination where the command is the one-way command:
      performing at least one security operation to mitigate an impact of performance of the one-way command; and
   in a second instance of the determination where the command is not any one-way command:
      initiating performance of the command without performing any of the at least one security operation.

2. The method of claim 1, further comprising:
   identifying permissions:
      for initiating performance of commands by the data processing system, and that are delegated to the first entity; and
   making a second determination, based on the permissions, regarding whether the first entity has permission to initiate performance of the command; and
   in a first instance of the second determination where the first entity has the permission to initiate performance of the command:
      initiating the making of the determination.

3. The method of claim 2, wherein the permissions are identified by parsing permission delegations for the first entity, and a first of the permission delegations for the first entity indicates delegation of a first class of the permissions and a second of the permission delegations for the first entity indicates delegation of a permission member of a second class of the permissions, and the permission member being a command executable by the data processing system.

4. The method of claim 3, wherein making the second determination, based on the permissions, regarding whether the first entity has permission to initiate the performance of the command comprises:
   discriminating a first portion of permissions from the first class of the permissions that indicate performance of non-one-way operations;
   discriminating a second portion of permissions from the first class of the permissions that indicate performance of one-way operations;
   establishing a set of valid permissions based on the first portion of the permissions from the first class of the permissions and the permission member of the second class of the permissions; and
   making the second determination using the set of valid permissions.

5. The method of claim 4, wherein the permission member indicates performance of one of the one-way operations.

6. The method of claim 5, wherein the first class of the permissions and the second class of the permissions are a same class.

7. The method of claim 6, wherein the at least one security operation comprises:
    identifying a proximity of the first entity to the data processing system;
    making a third determination regarding whether the proximity meets a proximity criteria;
    in a first instance of the third determination where the proximity meets the proximity criteria:
        initiating performance of the command by the data processing system to service the request; and
    in a second instance of the third determination where the proximity does not meet the proximity criteria;
        denying performance of the command to service the request.

8. The method of claim 7, wherein identifying the proximity comprises:
    disallowing use of all mechanisms through which information may be provided to the data processing system via proxying;
    issuing, while the use of the mechanisms are disallowed, a request for confirmation of performance of the one-way command; and
    determining the proximity based on any response to the request that is obtained by the data processing system while the use of the mechanisms are disallowed.

9. The method of claim 7, wherein identifying the proximity comprises:
    issuing a request for confirmation of performance of the one-way command;
    identifying a latency of communications between the data processing system and a device that provided a response to the request for the confirmation; and
    determining the proximity based on the latency of the communication.

10. The method of claim 7, wherein identifying the proximity comprises:
    issuing a request for confirmation of performance of the one-way command using a display that is known to be local to the data processing system, and a code being shown using the display;
    obtaining a response to the request; and
    determining the proximity based whether the response is based on the code.

11. The method of claim 7, where identifying the proximity comprises:
    issuing a request for confirmation of performance of the one-way command; and
    determining the proximity based whether an input device that is known to be local to the data processing system is used to provide a response to the request.

12. A non-transitory machine-readable medium having instructions stored therein, which when executed by a processor, cause the processor to perform operations for performing a security framework, the operations comprising:
    obtaining a request for a data processing system to perform a command, the request being from a first entity;
    making a determination regarding whether the command is a one-way command, and the one-way command is any command having an impact that cannot be reversed using a same mechanism through which a performance of the one-way command is initiated;
    in a first instance of the determination where the command is the one-way command:
        performing at least one security operation to mitigate an impact of performance of the one-way command; and
    in a second instance of the determination where the command is not any one-way command:
        initiating performance of the command without performing any of the at least one security operation.

13. The non-transitory machine-readable medium of claim 12, further comprising:
    identifying permissions:
        for initiating performance of commands by the data processing system, and that are delegated to the first entity; and
    making a second determination, based on the permissions, regarding whether the first entity has permission to initiate performance of the command; and
    in a first instance of the second determination where the first entity has the permission to initiate performance of the command:
        initiating the making of the determination.

14. The non-transitory machine-readable medium of claim 13, wherein the permissions are identified by parsing permission delegations for the first entity, and a first of the permission delegations for the first entity indicates delegation of a first class of the permissions and a second of the permission delegations for the first entity indicates delegation of a permission member of a second class of the permissions, and the permission member being a command executable by the data processing system.

15. The non-transitory machine-readable medium of claim 14, wherein making the second determination, based on the permissions, regarding whether the first entity has permission to initiate the performance of the command comprises:
    discriminating a first portion of permissions from the first class of the permissions that indicate performance of non-one-way operations;
    discriminating a second portion of permissions from the first class of the permissions that indicate performance of one-way operations;
    establishing a set of valid permissions based on the first portion of the permissions from the first class of the permissions and the permission member of the second class of the permissions; and
    making the second determination using the set of valid permissions.

16. The non-transitory machine-readable medium of claim 15, wherein the permission member indicates performance of one of the one-way operations.

17. A data processing system, comprising:
    a processor; and
    a memory coupled to the processor to store instructions, which when executed by the processor, cause the processor to perform operations for providing computer implemented service, the operations comprising:
        obtaining a request for a data processing system to perform a command, the request being from a first entity;
        making a determination regarding whether the command is a one-way command, and the one-way command is any command having an impact that cannot be reversed using a same mechanism through which a performance of the one-way command is initiated;
        in a first instance of the determination where the command is the one-way command:

performing at least one security operation to mitigate an impact of performance of the one-way command; and in a second instance of the determination where the command is not any one-way command:

initiating performance of the command without performing any of the at least one security operation.

18. The data processing system of claim 17, further comprising:

identifying permissions:

for initiating performance of commands by the data processing system, and that are delegated to the first entity; and making a second determination, based on the permissions, regarding whether the first entity has permission to initiate performance of the command; and in a first instance of the second determination where the first entity has the permission to initiate performance of the command:

initiating the making of the determination.

19. The data processing system of claim 18, wherein the permissions are identified by parsing permission delegations for the first entity, and a first of the permission delegations for the first entity indicates delegation of a first class of the permissions and a second of the permission delegations for the first entity indicates delegation of a permission member of a second class of the permissions, and the permission member being a command executable by the data processing system.

20. The data processing system of claim 19, wherein making the second determination, based on the permissions, regarding whether the first entity has permission to initiate the performance of the command comprises:

discriminating a first portion of permissions from the first class of the permissions that indicate performance of non-one-way operations;

discriminating a second portion of permissions from the first class of the permissions that indicate performance of one-way operations;

establishing a set of valid permissions based on the first portion of the permissions from the first class of the permissions and the permission member of the second class of the permissions; and making the second determination using the set of valid permissions.

\* \* \* \* \*